United States Patent
Yamada

(10) Patent No.: US 11,273,650 B2
(45) Date of Patent: Mar. 15, 2022

(54) PRINTING APPARATUS AND PRINTING METHOD

(71) Applicant: SEIKO EPSON CORPORATION, Tokyo (JP)

(72) Inventor: Yuki Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 267 days.

(21) Appl. No.: 16/601,194

(22) Filed: Oct. 14, 2019

(65) Prior Publication Data

US 2020/0114659 A1 Apr. 16, 2020

(30) Foreign Application Priority Data

Oct. 15, 2018 (JP) .............................. JP2018-194124

(51) Int. Cl.
*B41J 3/60* (2006.01)
*B41J 13/00* (2006.01)

(52) U.S. Cl.
CPC ............. *B41J 3/60* (2013.01); *B41J 13/0045* (2013.01)

(58) Field of Classification Search
CPC ..... B41J 11/008; B41J 11/004; B41J 11/0095; B41J 3/60; B41J 13/0045; B41J 15/00; G03G 15/231
See application file for complete search history.

(56) References Cited

U.S. PATENT DOCUMENTS

| | | | | |
|---|---|---|---|---|
| 5,655,208 A | * | 8/1997 | Sahay | G03G 15/234 271/277 |
| 5,670,995 A | * | 9/1997 | Kupcho | B41J 3/60 347/104 |
| 8,472,830 B2 | * | 6/2013 | Fukasawa | G03G 15/231 399/81 |
| 9,370,940 B1 | * | 6/2016 | LeFevre | B41J 11/0005 |
| 2004/0190926 A1 | * | 9/2004 | Burkes | G03G 15/50 399/82 |
| 2010/0302563 A1 | * | 12/2010 | Yamazaki | G03G 15/50 358/1.9 |
| 2011/0310151 A1 | * | 12/2011 | Serizawa | B41J 11/008 347/14 |
| 2015/0278649 A1 | * | 10/2015 | Yoshiwaka | B41J 11/008 358/1.12 |
| 2016/0210087 A1 | * | 7/2016 | Amir | G06F 3/124 |

FOREIGN PATENT DOCUMENTS

JP          2009-086398          4/2009

* cited by examiner

*Primary Examiner* — John Zimmermann
(74) *Attorney, Agent, or Firm* — Workman Nydegger

(57) ABSTRACT

A printing apparatus is provided which executes duplex printing on each print medium one by one when printing of a surface to be printed first of both surfaces of an (N+1)th print medium cannot be performed before starting printing of a surface to be printed later of both surfaces of an Nth print medium and continuously prints two print media when printing of a part of the surface to be printed first of the (N+1)th print medium can be performed before starting printing of the surface to be printed later of the Nth print medium.

7 Claims, 8 Drawing Sheets

PRINTING APPARATUS AND PRINTING METHOD

The present application is based on, and claims priority from, JP Application Serial Number 2018-194124, filed Oct. 15, 2018, the disclosure of which is hereby incorporated by reference herein in its entirety.

BACKGROUND

1. Technical Field

The present disclosure relates to a printing apparatus and a printing method, and in particular to duplex printing.

2. Related Art

Conventionally, regrading duplex printing, a method where duplex printing is sequentially performed on each print medium one by one (this method is referred to as normal duplex printing in the present specification) and a method where after printing one surface of a print medium, one surface of another print medium is printed during a process where the print medium whose one surface has been printed is transported to be turned upside down (for example, JP-A-2009-86398) are known. When performing duplex printing on a plurality of print media, the time required for the continuous duplex printing is shorter than the time required for the normal duplex printing.

In general, in the case of normal duplex printing, the normal duplex printing is performed on a print medium when print data for both of a front surface and a back surface of one print medium has been accumulated in a memory of a printing apparatus and it is determined that the front surface and the back surface can be printed at a certain time interval (it is not necessary to wait for reception of print data of the surfaces of the print medium after the printing operation is started).

JP-A-2009-86398 describes that a condition to execute high-speed duplex printing (continuous duplex printing) is that print data for two print media (four pages) is received within a set time. When the print data for two print media (four pages) cannot be received within the set time, the normal duplex printing is executed. Specifically, when the print data for two print media (four pages) cannot be received within the set time, by waiting for the set time, discharge of a first print medium is delayed from that in a case where the normal duplex printing of the first print medium is performed immediately after the print data of the first print medium (first and second pages) has been accumulated. If the set time is shortened in order to earlier discharge the first print medium, it becomes difficult to completely receive the print data for two print media (four pages) within the set time. As a result, the continuous duplex printing becomes difficult to be selected. However, as described above, in order to improve the entire throughput when the duplex printing is performed on a plurality of print media, it is desirable that the continuous duplex printing rather than the normal duplex printing is selected.

SUMMARY

An object of the present disclosure is to provide a technique that increases possibility to improve convenience of the duplex printing.

A printing apparatus for achieving the above object includes a receiving unit that receives print data and a print control unit that executes normal duplex printing when print data of a surface to be printed first of both surfaces of an (N+1)th print medium (N is an integer of one or more) is not received before starting printing of a surface to be printed later of both surfaces of an Nth print medium, and executes continuous duplex printing when a part print data of the surface to be printed first of the (N+1)th print medium is completely received before printing of the surface to be printed later of the Nth print medium is started. In a case of the normal duplex printing, duplex printing is sequentially executed on print media one by one, and in a case of the continuous duplex printing, during a process where a print medium whose one surface has been printed is transported to be turned upside down, one surface of another print medium is printed.

According to the above configuration, when the print data of the surface to be printed first of the (N+1)th print medium is not received before starting printing of the surface to be printed later of the Nth print medium, the normal duplex printing is executed on the Nth print medium, so that it is possible to quickly complete the duplex printing of the Nth print medium. Further, according to the above configuration, when the print data of the surface to be printed first of the (N+1)th print medium is received before starting printing of the surface to be printed later of the Nth print medium, the continuous duplex printing is executed on the Nth and following print media, so that it is possible to reduce the time required to execute duplex printing on the Nth and following print media as compared with a case where the continuous duplex printing is not executed on the Nth and following print media. Therefore, according to the above configuration, it is possible to increase possibility that convenience of the duplex printing is improved by switching between the normal duplex printing and the continuous duplex printing according to the condition described above.

Further, the print control unit may have a configuration to execute continuous duplex printing when all the print data of the surface to be printed first of the (N+1)th print medium is completely received before printing of the surface to be printed later of the Nth print medium is started.

If at a time point when a part of print data of the surface to be printed first of the (N+1)th print medium is received, a free space disappears from the storage unit that accumulates the print data and print data cannot be accumulated any more, it is not possible to complete the printing of the surface to be printed first of the (N+1)th print medium. In this case, for example, if the print data of the surface that has been printed first of the Nth print medium is discarded, a free space is generated in the storage unit and all the remaining part of print data of the surface to be printed first of the (N+1)th print medium may be accumulated in the storage unit. However, when the print data of the Nth print medium is discarded in a state where the printing of both surfaces of the Nth print medium is not completed, if the printing fails due to paper jam or the like while the surface to be printed later of the Nth print medium is being printed, reprint (recovery) of the Nth print medium cannot be performed by the printing apparatus 1 alone (the reprint cannot be performed unless the print data of the Nth print medium is retransmitted from a print request source). According to the above configuration, all the print data of the surface to be printed first of the (N+1)th print medium has been received (has been accumulated in the storage unit), so that it is possible to execute printing of the surface to be printed first of the (N+1)th print medium without discarding the print data of the Nth print medium. Further, the print data of the Nth print medium is not discarded, so that the recovery can be performed by the printing apparatus 1 alone even when the printing fails in the manner as described above. Therefore, in the case of the above configuration, it is possible to execute the continuous duplex printing in a state where the recovery can be performed by the printing apparatus 1 alone.

Further, the print control unit may have a configuration to perform judgement of execution determination of normal duplex printing or execution determination of continuous duplex printing at a plurality of timings during a period of time from when a part of print data of the surface to be printed first of the Nth print medium is received to when printing of the surface to be printed later of the Nth print medium is started.

According to the above configuration, a plurality of judgement timings are provided, so that it is possible to early determine execution of normal duplex printing and execute the normal duplex printing when a condition that the continuous duplex printing cannot be executed is established (at one of the plurality of judgement timings). Further, the plurality of judgement timings are provided, so that it is possible to early determine execution of continuous duplex printing and execute the continuous duplex printing when a condition that the continuous duplex printing can be executed is established.

Further, the print control unit may have a configuration to perform judgement of execution determination of normal duplex printing or execution determination of continuous duplex printing when the Nth print medium is transported to a paper discharge port in a state where printing of the surface to be printed first of the Nth print medium is completed and printing of the surface to be printed later of the Nth print medium is not completed.

According to the above configuration, even if it is not possible to determine execution of continuous duplex printing in a stage before the printing of the surface to be printed first of the Nth print medium is completed and the Nth print medium is transported to the paper discharge port, the normal duplex printing is not determined in this stage, and it is possible to judge whether or not it is possible to determine again the execution of the continuous duplex printing in a stage when the printing of the surface to be printed first of the Nth print medium is completed and the Nth print medium is transported to the paper discharge port.

Further, the printing apparatus may be a serial ink jet printer. In the case of the serial ink jet printer, time intervals between printing to surfaces of print media need not be constant, and printing operation can be stopped temporarily and restarted for waiting for reception of print data after a printing operation on a print media is started. Therefore, it is not necessary to wait for completion of reception of all print data for two print media (four pages) as a condition to perform continuous duplex printing. Therefore, it is possible to accelerate timing of starting a printing operation.

DESCRIPTION OF EXEMPLARY EMBODIMENTS

Here, an embodiments of the present disclosure will be described in the following order:
1. Configuration of Printing Apparatus:
2. Duplex Printing Determination Processing:
3. Operation Example: and
4. Other Embodiments:

1. Configuration of Printing Apparatus

Figure 1:
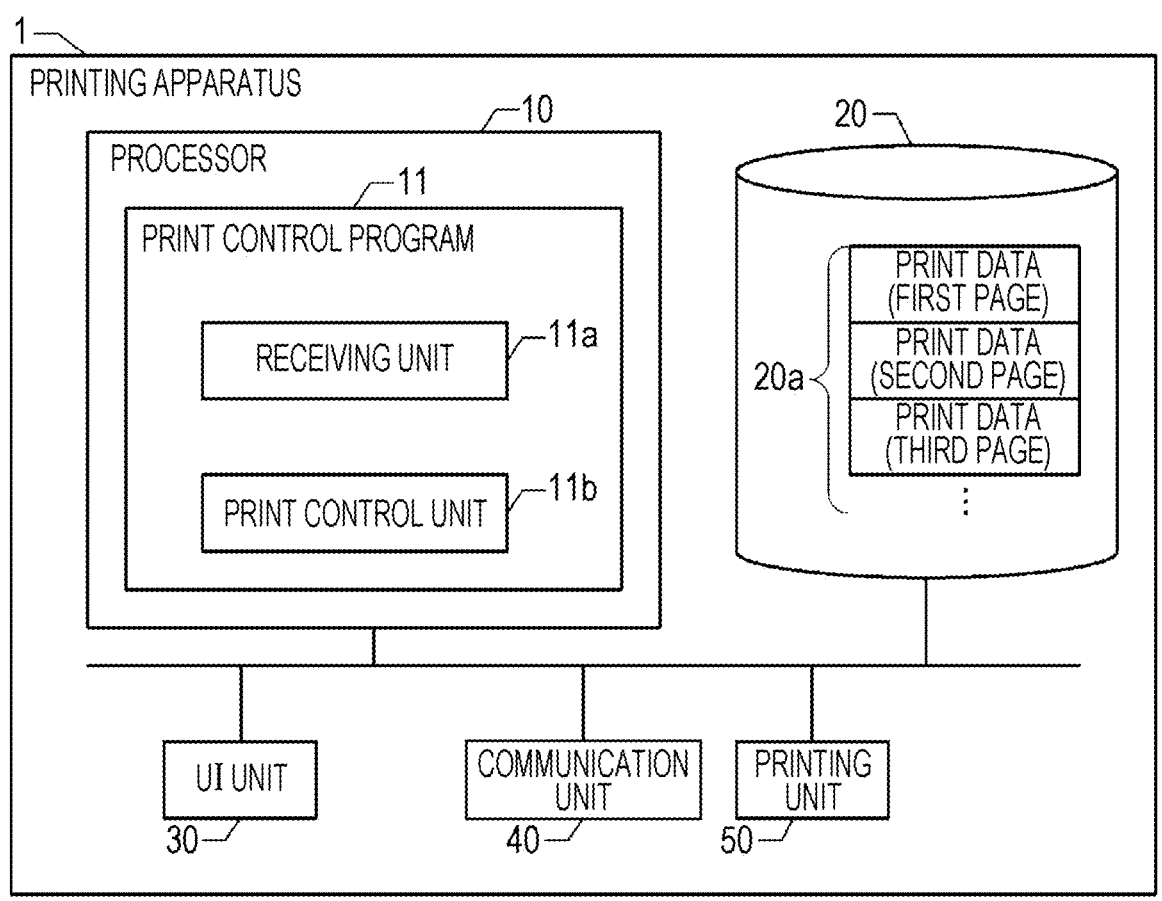
FIG. 1 is a block diagram showing a configuration of a printing apparatus.

FIG. 1 is a block diagram showing a configuration of a printing apparatus 1 according to an embodiment of the present disclosure. The printing apparatus 1 includes a processor 10, a storage unit 20, a UI (User Interface) 30, a communication unit 40, and a printing unit 50. The processor 10 includes a CPU, a ROM, and a RAM, which are not shown in the drawings. The CPU executes various programs stored in the ROM or the like, so that the processor 10 can control each unit of the printing apparatus 1. The processor 10 may be composed of a single chip or may be composed of a plurality of chips. Alternatively, an ASIC may be employed instead of the CPU, or the CPU and the ASIC may cooperate together.

The UI unit 30 includes a touch-panel type display, various keys and switches, and the like. The processor 10 can acquire operation content of a user through the UI unit 30. Further, the processor 10 can display various information on the display of the UI unit 30 and notify the user of the various information.

The communication unit 40 includes an communication interface circuit for communicating with other apparatuses wiredly or wirelessly connected to the printing apparatus 1 according to various communication protocols. The processor 10 can receive print job data (including print data) from another apparatus connected through the communication unit 40.

Figure 2:
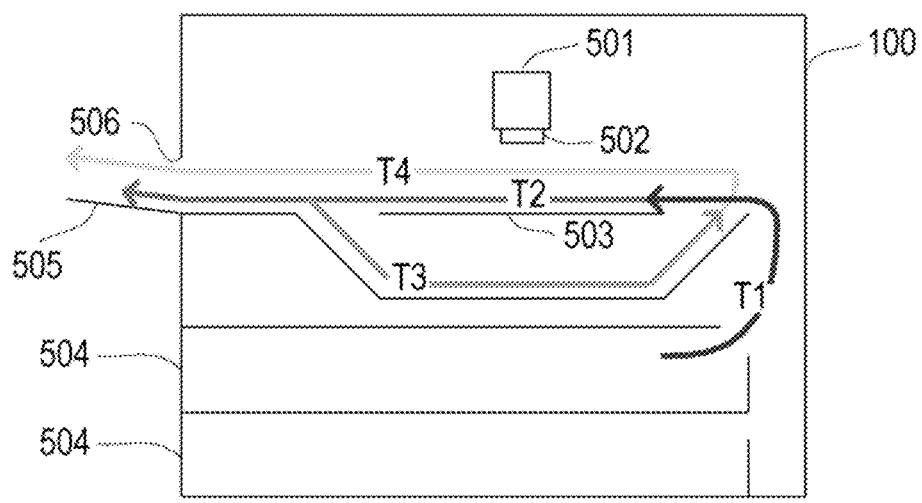
FIG. 2 is a schematic diagram showing an outline configuration of a printing unit.

The printing unit 50 includes an actuator, a sensor, a drive circuit, machine parts, and the like for executing printing on various print media by a serial ink jet system. FIG. 2 is a schematic diagram showing an outline configuration of the printing unit 50. As shown in FIG. 2, the printing unit 50 includes a carriage 501, a recording head 502, a support table 503, cassettes 504, and a paper discharge tray 505.

The carriage 501 reciprocates in a main scanning direction along a guide shaft (not shown in the drawings) laid in a state of extending in the main scanning direction. The main scanning direction is parallel with a depth direction of a paper surface of FIG. 2. The recording head 502 is mounted on the carriage 501 and discharges ink to a print medium being transported on the support table 503. The print medium is transported from right to left of the paper surface on the support table 503. An image is formed on the print medium when the carriage 501 moves in the main scanning direction and the recording head 502 discharges ink to the print medium while the carriage is moving.

The cassette 504 stores print media. The cassette 504 is detachably attached to inside of a housing 100 of the printing apparatus 1. The printing unit 50 of the present embodiment includes two cassettes 504. However, of course, the number of the cassettes 504 may be one or three or more. Further, in addition to the cassettes 504, a paper feed tray attached to outside of the housing 100 may be included. The housing 100 is formed with an opening (a paper discharge port 506) for discharging a print medium. The paper discharge tray 505 (stacker) is attached to a lower portion of the paper discharge port 506 and holds printed print media that are discharged from the paper discharge port 506 of the housing 100.

The printing unit 50 of the present embodiment can execute simplex printing and duplex printing. In the case of simplex printing, a print medium placed in the cassette 504 is fed by a transport roller (not shown in the drawings) or the like (T1), transported from right of left of the paper surface on the support table 503, and discharged to the paper discharge tray 505 (T2). An image is formed on the print medium by the recording head 502 while the print medium is transported on the support table 503. In this case, the print medium is discharged to the paper discharge tray 505 in a face-up state where the printed surface faces up. In the present embodiment, face-down discharge (the printed surface faces down) in the simplex printing is executed by transporting the print medium in order from T3 to T4 after the aforementioned T1 and T2. In T3, the print medium partially discharged from the paper discharge port 506 is switched back and transported from left to right of the paper surface in a transport path below the support table 503. In T4, the print medium is turned upside down and transported from right to left of the paper surface on the support table 503.

In the case of duplex printing, normal duplex printing or continuous duplex printing is employed in the present embodiment. The normal duplex printing is a method of sequentially executing duplex printing on print media one by one. In the case of normal duplex printing, the steps T1, T2, T3, and T4 described above are sequentially executed for each print medium. An image is formed on the print medium by the recording head 502 in a process (T2 and T4) where the print medium is transported on the support table 503. Each print medium is stacked on the paper discharge tray 505 in a state where the surface printed later of both surfaces of each medium faces up (in a face-up state).

The continuous duplex printing is a method where, after one surface of a print medium is printed, in a process where the print medium whose one surface has been printed is transported for being turned upside down, one surface of another print medium is printed. For example, when print data for a total of four pages is printed to two print media by the continuous duplex printing, the print data is printed in a manner as described below. That is, T1 and T2 are executed on a first print medium, T3 is executed on the first print medium and T1 and T2 are executed on a second print medium, T4 is executed on the first print medium and T3 is executed on the second print medium, and T4 is executed on the second print medium. When the continuous duplex printing is executed on print media, a time required to complete duplex printing on the print media can be shorter than that in a case where the normal duplex printing is executed on the same number of print media in the same condition.

In the present embodiment, the continuous duplex printing may be inapplicable depending on setting values related to duplex printing, types of print media to be printed, and the like, which are set in the printing apparatus 1. When the continuous duplex printing is inapplicable, duplex printing is executed by the method of normal duplex printing. For example, when a setting value of a setting item of an operating sound reduction mode is set to ON in the printing apparatus 1, the continuous duplex printing is inapplicable. Even when the operating sound reduction mode is OFF, the continuous duplex printing is inapplicable in cases as described below. For example, sizes of print media where the continuous duplex printing can be executed are determined in advance from a relationship between the length of the transport path and a length of a print medium in a transport direction. In the present embodiment, for example, print media of A4 or smaller are the sizes of print media where the continuous duplex printing can be executed. Therefore, in the present embodiment, print media larger than A4 are inapplicable to the continuous duplex printing. Further, in the present embodiment, even when the size of the print medium is A4 or smaller, the continuous duplex printing is inapplicable in at least one of the following cases: paper feed methods of print media are different from each other (for example, cassette feed and back side feed), sizes of print media are different from each other, and paper types (paper qualities) of print media are different from each other. Specifically, for example, an A4 size plain paper and a postcard are inapplicable to the continuous duplex printing.

Figure 3:
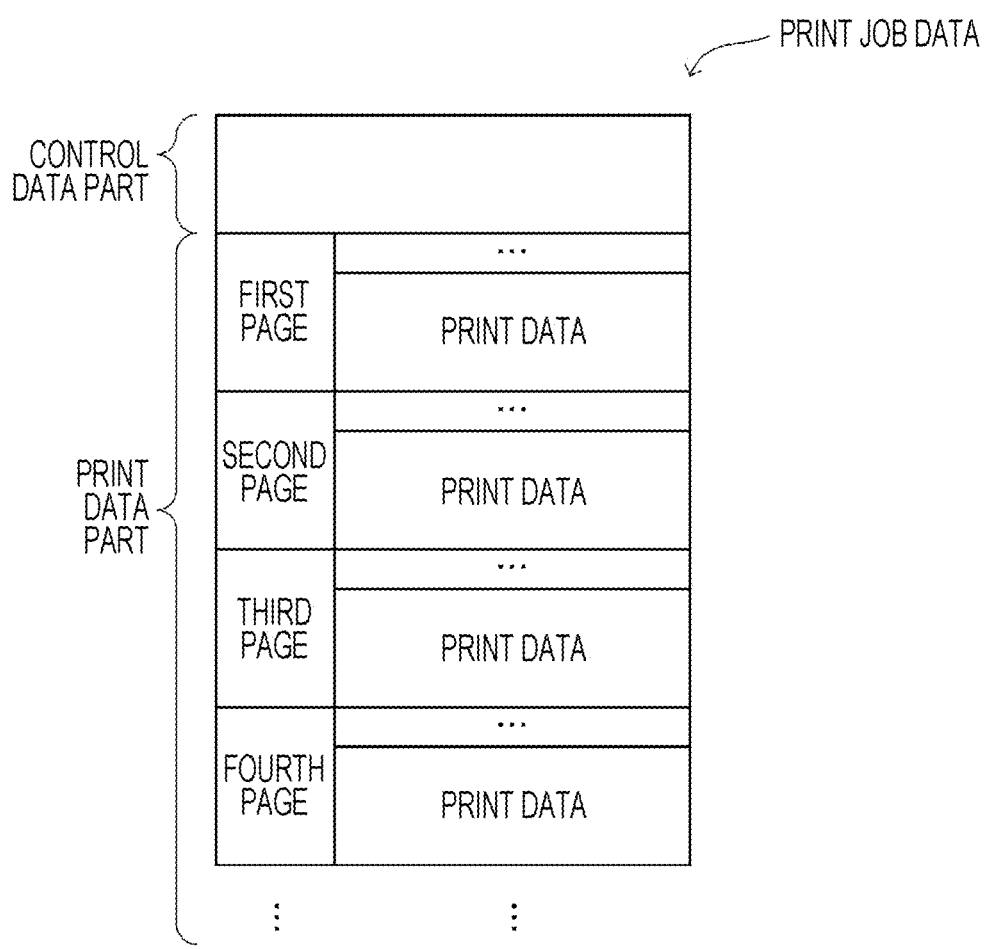
FIG. 3 is a diagram showing an example of a configuration of print job data.

Print data 20a of each page included in the print job data received from an external device such as a PC through the communication unit 40 is accumulated in the storage unit 20. FIG. 3 is a diagram showing an example of a data structure of the print job data. As shown in FIG. 3, the print job data includes a control data portion and a print data portion. The print data portion follows the control data portion. The control data portion includes a simplex/duplex flag indicating simplex printing or duplex printing, a print layout (allocation and the like), the number of print copies, a job creator (user), and the like. The print data portion includes print data for each page to be printed in page order. Further, (for example, the print data portion of) the print job data includes information such as a size (for example, A4, A3, or the like) of print medium where print data of each page is printed, a type (for example, plain paper, glossy paper, or the like) of the print medium, and the like in association with each page.

The print data 20a of each page is accumulated in the storage unit 20 in a compressed state. A data size of print data of each page in a compressed state may vary for each page (for example, the data size may vary according to occupancy ratios of photographic images and blank portions). The print data 20a is discarded from the storage unit 20 when the print data 20a becomes unnecessary to be held for jam recovery. The jam recovery is a function to resume printing from a print medium including a page where the printing fails without requesting an external apparatus such as a PC that is a transmission source of the print job data to retransmit the print data when the printing fails due to paper jam or the like during the printing. Therefore, in the case of duplex printing, print data of pages assigned respectively to both surfaces of a print medium are held in the storage unit 20 until printing of both surfaces of the print medium is finished and discharge of the print medium is completed (until possibility of paper jam disappears), and when the discharge of the print medium is completed, the print data of pages assigned to both surfaces of the print medium are discarded.

A print control program 11 is included in various programs executed by the processor 10. The print control program 11 includes a receiving unit 11a and a print control unit 11b in order to determine execution of either normal duplex printing or continuous duplex printing and realize a function of executing duplex printing by a determined method.

The receiving unit 11a is a program module that causes the processor 10 to realize a function to receive print job data including print data. The processor 10 receives the print job data from an external device such as a PC through the communication unit 40 and accumulates the print data 20a in the storage unit 20 by the function of the receiving unit 11a. When a storage area of the storage unit 20 which accumulates the print data 20a becomes full, the processor 10 does not receive print data transmitted from an external apparatus until print data is discarded at timing described above and a free space is generated in the storage area.

The print control unit 11b is a program module that causes the processor 10 to realize a function to execute the normal duplex printing when print data of a surface to be printed first of both surfaces of an (N+1)th print medium (N is an integer of one or more) is not received before starting printing of a surface to be printed later of both surfaces of an Nth print medium, and execute the continuous duplex printing when a part of print data of a surface to be printed first of an (N+1)th print medium has been received before starting printing of a surface to be printed later of an Nth print medium.

Here, a surface to be printed first and a surface to be printed later of both surfaces of a print medium will be described. In the case of face-up where a print medium is discharged while a printed surface faces up, after both surfaces have been printed, the print medium is discharged while a surface printed later of both surfaces faces up (while a surface printed first faces down). Therefore, when duplex printing is executed by assigning one page for each surface of a plurality of print media, if it is controlled so that print data of odd-numbered pages are printed in ascending order to surfaces to be printed first and print data of even-numbered pages are printed in ascending order to surfaces to be printed later, the print media are stacked on the paper discharge tray 505 in a state where a printed surface of 2Nth page which is printed later on an Nth print medium and a printed surface of (2N+1)th page which is printed first on an (N+1)th print medium are in contact with each other. Therefore, by performing control as described above, it is not necessary to sort the print media, both surfaces of which have been printed and which are stacked on the paper discharge tray 505, to arrange the print media in page order.

In the case of face-down where a print medium is discharged while a printed surface faces down, after both surfaces have been printed, the print medium is discharged while a surface printed first of both surfaces faces up (while a surface printed later faces down). Therefore, when duplex printing is executed by assigning one page for each surface of a plurality of print media, if it is controlled so that print data of even-numbered pages are printed in ascending order to surfaces to be printed first and print data of odd-numbered pages are printed in ascending order to surfaces to be printed later, the print media are stacked on the paper discharge tray 505 in a state where a printed surface of 2Nth page which is printed first on an Nth print medium and a printed surface of (2N+1)th page which is printed later on an (N+1)th print medium are in contact with each other.

In the description of the present embodiment, it is assumed that print media are discharged in a face-up state in the case of duplex printing. In the following description, an example is described where printing is executed while a plurality of pages are not assigned to one surface of a print medium and one page is assigned to one surface.

Figure 4:
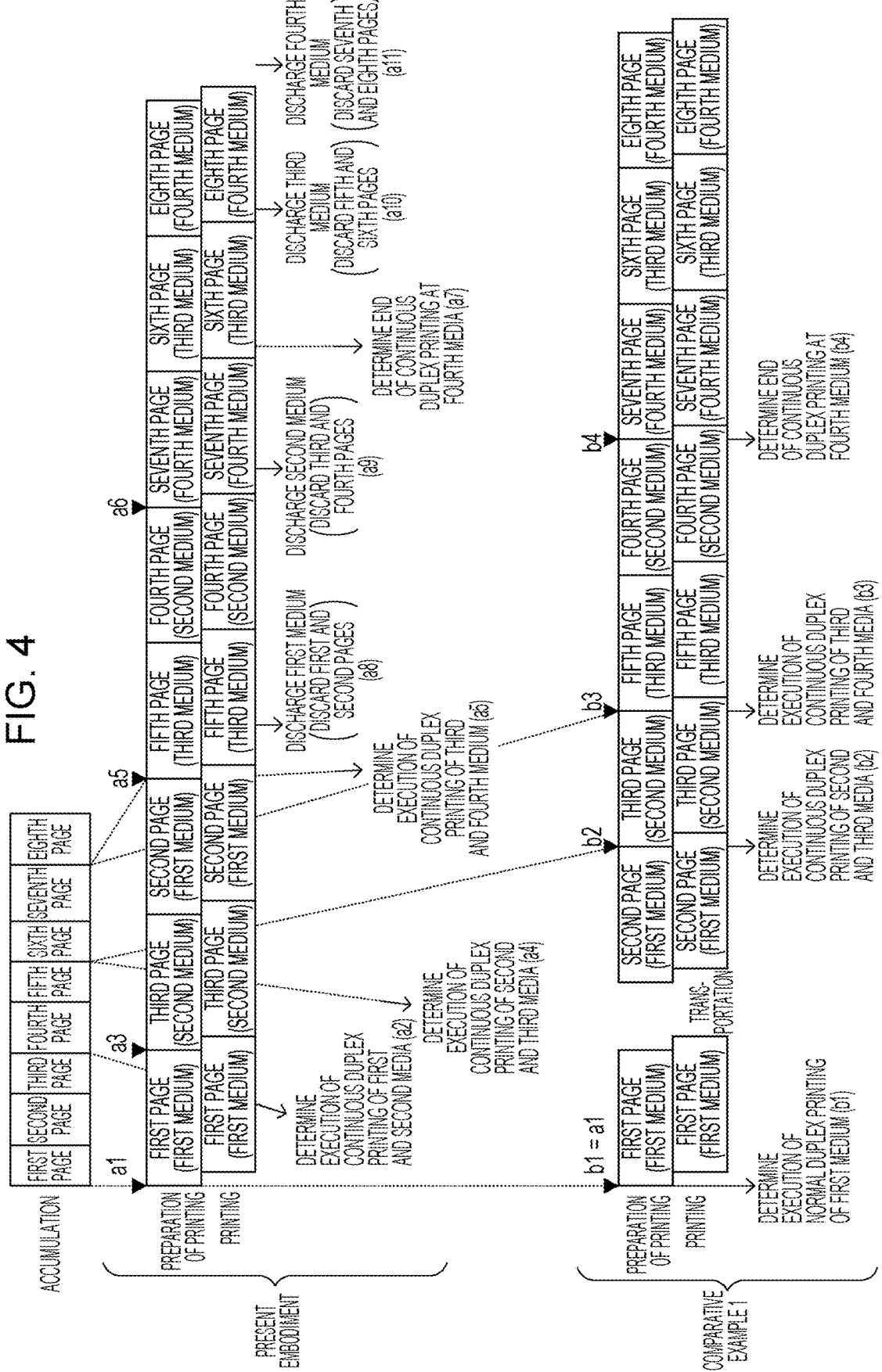
FIG. 4 is a timing chart showing an example of timing of accumulation of print data and printing.

When print job data is transmitted from an external apparatus to the printing apparatus 1, as described above, print data is accumulated in the storage unit 20 in order from a first page by the function of the receiving unit 11a. FIG. 4 is a timing chart showing an example of timing of accumulation of print data and execution of printing. As shown in FIG. 4, when starting receiving print data of first page, the processor 10 converts the print data of the first page sequentially from a portion that has been received into a format of data suitable to be printed by the printing unit 50, and causes the printing unit 50 to start printing the first page based on the converted data. Specifically, the data conversion includes steps such as, for example, decompression processing of compressed print data, resolution conversion processing, color conversion processing, halftone processing, and rearrangement processing. While printing is executed based on the converted data, reception and accumulation of print data to be received and conversion of data are performed in parallel.

By the function of the print control unit 11b, the processor 10 performs judgement of execution determination of continuous duplex printing or execution determination of normal duplex printing for a plurality of times during a period of time from when a part of print data of a surface to be printed first of an Nth print medium (in the present embodiment, the print data corresponds to print data of an odd-numbered page because one page is assigned to one surface and the print medium is discharged in a face-up state) is received (and accumulated) to when printing of Nth print medium is completed and the N print medium is transported to the paper discharge port 506 as shown by T2 of FIG. 2 (this is included in a period of time until printing of a page assigned to a surface to be printed later of the Nth print medium is started).

In the present embodiment, a condition to determine execution of the normal duplex printing is that the continuous duplex printing is inapplicable or that all print data of a surface to be printed first of both surfaces of an (N+1)th print medium is not completely received before starting printing of a surface to be printed later of both surfaces of an Nth print medium. In the present embodiment, a condition to determine execution of the continuous duplex printing is that the continuous duplex printing is not inapplicable and all print data of a surface to be printed first of an (N+1)th print medium is completely received before starting printing of a surface to be printed later of an Nth print medium.

As described above, according to the present embodiment, judgement for determining execution of normal duplex printing or continuous duplex printing is executed at a plurality of timings, so that it is possible to early determine execution of normal duplex printing and execute the normal duplex printing when a condition that the continuous duplex printing cannot be executed is established. Further, according to the present embodiment, it is possible to early determine execution of continuous duplex printing and execute the continuous duplex printing when a condition that the continuous duplex printing can be executed is established.

In the present embodiment, the last timing of the plurality of judgement timings described above is timing when printing of a surface to be printed first of an Nth print medium is completed and the Nth print medium is transported to the paper discharge port 506 (in a state where printing of a surface to be printed later of the Nth print medium is not completed). Therefore, even if it is not possible to determine execution of continuous duplex printing in a stage before the printing of the surface to be printed first of the Nth print medium is completed and the Nth print medium is transported to the paper discharge port 506, the normal duplex printing is not determined in this stage, and it is possible to judge whether or not it is possible to determine the execution of the continuous duplex printing in a stage when the printing of the surface to be printed first of the Nth print medium is completed and the Nth print medium is transported to the paper discharge port 506.

The timing when the Nth print medium where only one surface is printed is transported to the paper discharge port 506 may be assumed to be specifically, for example, timing when a transport direction of the Nth print medium that is transported in a direction to be discharged from the paper discharge port 506 is switched to the opposite direction (timing when the print medium is drawn to be transported along T3). Further, the timing may be assumed to be timing when a tip of the Nth print medium is exposed to the outside of the housing 100 from the paper discharge port 506, timing when the print medium starts to be transported to the paper discharge port 506 after ink is finally discharged to the surface to be printed first of the Nth print medium, and the like.

As described above, in the present embodiment, the condition to determine execution of the continuous duplex printing is that the continuous duplex printing is not inapplicable and all print data of a surface to be printed first of an (N+1)th print medium is completely received before starting printing of a surface to be printed later of an Nth print medium. If at a time point when a part of print data of a surface to be printed first of an (N+1)th print medium is received, a free space disappears from the storage unit that accumulates the print data and print data cannot be accumulated any more, it is not possible to complete the printing of the surface to be printed first of the (N+1)th print medium. In this case, for example, if the print data of the surface that has been printed first of the Nth print medium is discarded, a free space is generated in the storage unit and all the remaining part of print data of the surface to be printed first of the (N+1)th print medium may be accumulated in the storage unit. However, when the print data of the Nth print medium is discarded in a state where the printing of both surfaces of the Nth print medium is not completed, if the printing fails due to paper jam or the like while the surface to be printed later of the Nth print medium is being printed, recovery of the Nth print medium cannot be performed by the printing apparatus 1 alone (the print data of the Nth print medium needs to be retransmitted). In the present embodiment, all the print data of the surface to be printed first of the (N+1)th print medium has been received (has been accumulated in the storage unit), so that it is possible to execute printing of the surface to be printed first of the (N+1)th print medium without discarding the print data of the Nth print medium. Further, the print data of the Nth print medium is not discarded, so that the recovery can be performed by the printing apparatus 1 alone even when the printing fails in the manner as described above. Therefore, in the present embodiment, it is possible to execute continuous duplex printing in a state where the recovery can be performed by the printing apparatus 1 alone.

As described above, in the present embodiment, when the print data of the surface to be printed first of the (N+1)th print medium is not received before starting printing of the surface to be printed later of the Nth print medium, the normal duplex printing is executed on the Nth print medium, so that it is possible to quickly complete the duplex printing of the Nth print medium. When the print data of the surface to be printed first of the (N+1)th print medium is received before starting printing of the surface to be printed later of the Nth print medium, the continuous duplex printing is executed on the Nth and following print media, so that it is possible to reduce the time required to execute duplex printing on the Nth and following print media as compared with a case where the continuous duplex printing is not executed on the Nth and following print media. Therefore, in the present embodiment, it is possible to increase possibility that convenience of the duplex printing is improved by switching between the normal duplex printing and the continuous duplex printing according to the condition described above.

2. Duplex Printing Determination Processing

Figure 5:
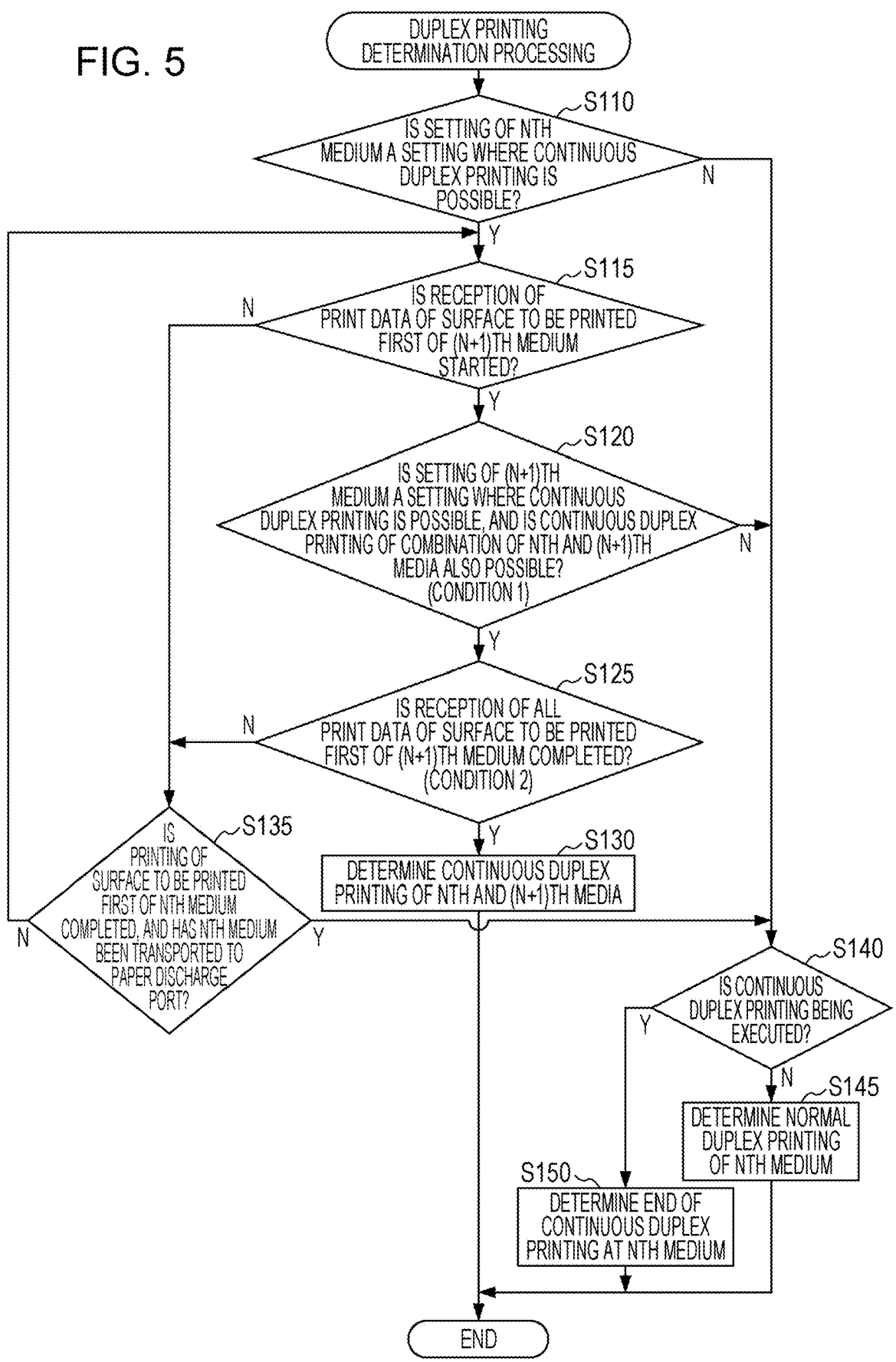
FIG. 5 is a flowchart showing duplex printing determination processing.

FIG. 5 is a flowchart showing duplex printing determination processing which the processor 10 executes by the function of the print control unit 11*b*. The duplex printing determination processing is started when starting print preparation for executing printing of a surface to be printed first of an Nth print medium whose both surfaces are not printed. The duplex printing determination processing for the Nth print medium is processing that performs (A) determination of execution of normal duplex printing of the Nth print medium, or (B) determination of execution (start or continuation) of continuous duplex printing of the Nth and (N+1)th print media, or (C) determination of end of continuous duplex printing at the Nth print medium.

When the duplex printing determination processing for the Nth print medium is started, at least a part of print data of a page assigned to a surface to be printed first of the Nth print medium has been received (has been accumulated in the storage unit 20). When (A) or (B) or (C) described above is determined by executing the duplex printing determination processing, a printing order of pages to be printed to the print medium is decided. When the printing order is decided, print preparation processing (data conversion and the like) for printing print data of pages in the printing order and print processing (transport of print medium, discharge of ink, and the like) are sequentially executed. The print preparation processing and the print processing according to the decided printing order can be executed in parallel with the duplex printing determination processing of FIG. 5 for a print medium where the method of duplex printing has not been determined. The print preparation processing and the print processing of a surface to be printed first of a first print medium when the printing apparatus 1 starts duplex printing from a state where the printing apparatus 1 does not execute printing is exceptionally executed in parallel with the duplex printing determination processing for the first print medium without waiting for determination of the method of duplex printing of the first print medium. This is because the printing order of a surface to be printed first of the first print medium is the first even when either execution of normal duplex printing of the first print medium or execution of continuous duplex printing of the first and second print media is determined, so that it is not necessary to wait for the determination of the method of duplex printing. Further, this is because, in the case of a serial ink jet printer, time intervals between printing to surfaces of print media need not be constant (because printing operation can be stopped temporarily and restarted), so that there is no problem even when starting printing of the first page in a state where the printing order of the first and following pages is not determined.

Steps of the duplex printing determination processing of FIG. 5 will be described in order. When the duplex printing determination processing for the Nth print medium is started, the processor 10 judges whether or not the setting of the Nth print medium is a setting where the continuous duplex printing is possible (step S110). Specifically, the processor 10 refers to the control data portion or the print data portion of the print job data and acquires a print setting of a page to be printed to the Nth print medium. Then, the processor 10 judges whether the print setting of the page to be printed to the Nth print medium is a value indicating that the continuous duplex printing is inapplicable or a value indicating that the continuous duplex printing is not inapplicable. Specifically, for example, when a paper size of a page (both surfaces) assigned to the Nth print medium is A3, No is judged in step S110. Further, for example, when a paper size of a page (both surfaces) assigned to the Nth print medium is A4, Yes is judged in step S110. In the following description, it is assumed that the operating sound reduction mode is set to OFF in the printing apparatus 1.

In step S110, when the setting of the Nth print medium is not judged as a setting where the continuous duplex printing is possible, the processor 10 judges whether or not the continuous duplex printing is being executed (step S140). In other words, the processor 10 judges whether or not the execution of continuous duplex printing has already been determined for the (N−1)th and Nth print media. When the processor 10 does not judge that the continuous duplex printing is being executed in step S140, the processor 10 determines to execute the normal duplex printing on the Nth print medium (step S145) and ends the duplex printing determination processing for the Nth print medium. When the normal duplex printing of the Nth print medium is determined, a printing order is decided where a page assigned to a surface to be printed first of the Nth print medium is printed, then the Nth print medium is turned upside down, and finally a page assigned to a surface to be printed later of the Nth print medium is printed.

In step S140, when the processor 10 judges that the continuous duplex printing is being executed, the processor 10 determines to end the continuous duplex printing at the Nth print medium (step S150) and ends the duplex printing determination processing for the Nth print medium. When the continuous duplex printing is being executed, the continuous duplex printing has already been determined for the (N−1)th and Nth print media, so that a printing order of a page to be printed later of the (N−1)th medium is decided. Therefore, it is determined to end the continuous duplex printing at the Nth print medium during the continuous duplex printing, so that it is decided that a page assigned to a surface to be printed later of the Nth print medium is printed next.

In step S110, when the setting of the Nth print medium is judged as a setting where the continuous duplex printing is possible, the processor 10 judges whether or not reception of print data of a page assigned to a surface to be printed first of the (N+1)th print medium is started (step S115). In step S115, when the processor 10 does not judge that the reception of print data of the page assigned to the surface to be printed first of the (N+1)th print medium is started, the processor 10 judges whether or not the printing of the surface to be printed first of the Nth print medium is completed and the Nth print medium has been transported to the paper discharge port 506 (step S135).

In step S135, when the processor 10 does not judge that the printing of the surface to be printed first of the Nth print medium is completed and the Nth print medium has been transported to the paper discharge port 506, the processor 10 returns to the processing of step S115. In step S135, when the processor 10 judges that the printing of the surface to be printed first of the Nth print medium is completed and the Nth print medium has been transported to the paper discharge port 506, the processor 10 executes the processing of step S140.

In step S115, when the processor 10 judges that the reception of print data of the surface to be printed first of the (N+1)th print medium is started, the processor 10 judges whether or not the setting of the (N+1)th print medium is a setting where the continuous duplex printing is possible and a combination of the settings of the Nth and (N+1)th print media is also a combination indicating that the continuous duplex printing is possible (condition 1) (step S120). Specifically, the processor 10 refers to the control data portion or the print data portion of the print job data and acquires a print setting of a page to be printed to the (N+1)th print medium. Then, the processor 10 judges whether the print setting of the page to be printed to the (N+1)th print medium is a value indicating that the continuous duplex printing is inapplicable or a value indicating that the continuous duplex printing is not inapplicable. When the setting of the (N+1)th print medium is a setting where the continuous duplex printing is inapplicable, No is judged in step S120. When the setting of the (N+1)th print medium is a setting where the continuous duplex printing is not inapplicable, further, the processor 10 refers to the setting of the Nth print medium acquired in step S110 and judges whether or not the continuous duplex printing can be executed on the Nth print medium and the (N+1)th print medium. Specifically, for example, when a paper size of a page to be printed to the (N+1)th print medium is postcard, if a paper size of a page to be printed to the (N+1)th print medium is A4, the paper sizes of the Nth and (N+1)th print media are different from each other, so that it is judged that the continuous duplex printing cannot be executed on the Nth and (N+1)th print media although the postcard is not inapplicable to the continuous duplex printing.

In step S120, when it is not judged that the condition 1 is satisfied, the processor 10 executes the processing of step S140. In step S120, when it is judged that the condition 1 is satisfied, the processor 10 judges whether or not all print data of a page assigned to a surface to be printed first of the (N+1)th print medium is completely received (condition 2) (step S125). In step S125, when it is not judged that the condition 2 is satisfied, the processor 10 executes the processing of step S135. That is, the condition 1 and the condition 2 are repeatedly judged until Yes is judged in step S135 (there are a plurality of judgement timings).

In step S125, when it is judged that the condition 2 is satisfied, the processor 10 determines the continuous duplex printing of the Nth and (N+1)th print media (step S130) and ends the duplex printing determination processing for the Nth print medium. Execution (start or continuation) of the continuous duplex printing is determined for the Nth and (N+1)th print media, so that a printing order of pages assigned to the Nth print medium and pages assigned to the (N+1)th medium is decided. The printing order is different between a case where the Nth print medium is the head of the continuous duplex printing (the continuous duplex printing is started) and a case where the Nth print medium is not the head of the continuous duplex printing (the continuous duplex printing has been being executed from the print media prior to the Nth print medium and the continuous duplex printing is continued).

Specifically, when the Nth print medium is the head of the continuous duplex printing (the continuous duplex printing is started), it is decided that the page assigned to the surface to be printed first of the Nth print medium is printed, then the page assigned to the surface to be printed first of the (N+1)th print medium is printed while the Nth print medium is transported to be turned upside down, and finally the page assigned to the surface to be printed later of the Nth print medium is printed.

When the Nth print medium is not the head of the continuous duplex printing (the continuous duplex printing is continued), the continuous duplex printing has already been decided for the (N−1)th and Nth print media, so that a printing order of pages to the page assigned to the surface to be printed later of the (N−1)th print medium has been decided. Therefore, continuation of the continuous duplex printing of the Nth and (N+1)th print media is determined when the Nth print medium is not the head of the continuous duplex printing, so that it is decided that the page assigned to the surface to be printed first of the (N+1)th print medium is printed in a state where the Nth print medium is made to stand by to be turned upside down, the Nth print medium made to stand by is turned upside down, and the page assigned to the surface to be printed later of the Nth print medium is printed.

3. Operation Example

Next, an operation example of determination and printing order of the duplex printing determination processing will be described with reference to FIG. 4. The operation example will be described on the assumption that the print job of the example of FIG. 4 has a total of eight pages, print data of eight pages can be accumulated in the storage unit 20, and the print setting of the total of eight pages are not inapplicable to the continuous duplex printing.

Figure 6:
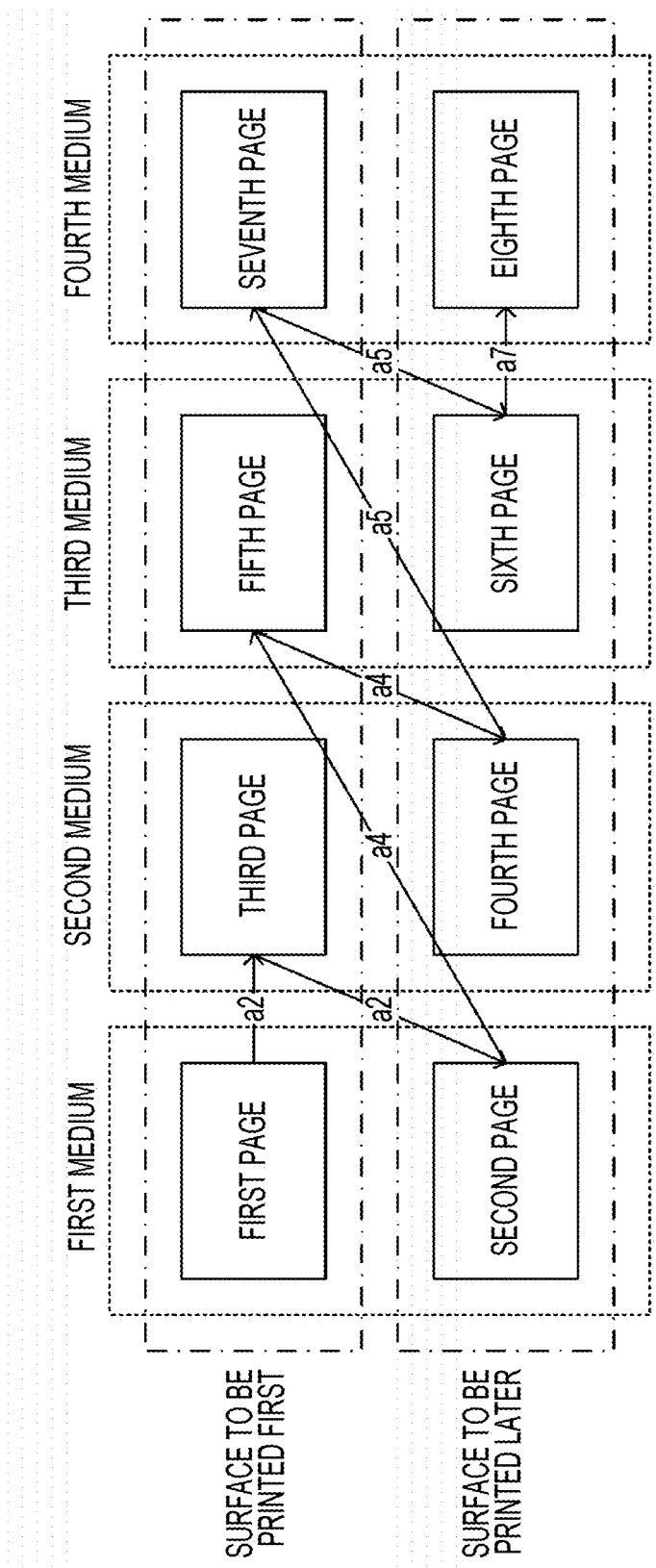
FIG. 6 is a schematic diagram showing a printing order of pages.

First, at the timing (a1) of starting the print preparation processing of the first page, the processor 10 starts the duplex printing determination processing (N=1) of FIG. 5 for the first print medium. As shown in FIG. 4, reception of print data of the third page (a page assigned to a surface to be printed first of the second print medium) is completed until when the printing of the first page (a page assigned to a surface to be printed first of the first print medium) is completed and the first print medium is transported to the paper discharge port 506, and the continuous duplex printing is not inapplicable, so that the processor 10 determines execution of continuous duplex printing of the first and second print media (a2). Therefore, at the stage a2, a printing order of first page (first print medium), third page (second print medium), and second page (first print medium) is decided (see FIG. 6). The processor 10 sequentially executes the print preparation processing and the print processing in the decided order.

Subsequently, at the timing (a3) of starting the print preparation processing of the third page, the processor 10 starts the duplex printing determination processing (N=2) of FIG. 5 for the second print medium. Reception of print data of the fifth page (a page assigned to a surface to be printed first of the third print medium) is completed until when the printing of the third page (a page assigned to a surface to be printed first of the second print medium) is completed and the second print medium is transported to the paper discharge port 506, and the continuous duplex printing is not inapplicable, so that the processor 10 determines execution of continuous duplex printing of the second and third print media (a4). Therefore, at the stage a4, a printing order of fifth page (third print medium) and fourth page (second print medium) is decided (see FIG. 6).

Subsequently, at the timing (a5) of starting the print preparation processing of the fifth page, the processor 10 starts the duplex printing determination processing (N=3) of FIG. 5 for the third print medium. At the timing of a5, reception of print data of the seventh page (a page assigned to a surface to be printed first of the fourth print medium) is completed and the continuous duplex printing is not inapplicable, so that the processor 10 determines execution of continuous duplex printing of the third and fourth print media (a5). Therefore, at the stage a5, a printing order of seventh page (fourth print medium) and sixth page (third print medium) is decided (see FIG. 6).

Subsequently, at the timing (a6) of starting the print preparation processing of the seventh page, the processor 10 starts the duplex printing determination processing (N=4) of FIG. 5 for the fourth print medium. Reception of print data of the ninth page is not completed (because the print job of the present example has a total of eight pages and there is no ninth page) until when the printing of the seventh page (a page assigned to a surface to be printed first of the fourth print medium) is completed and the fourth print medium is transported to the paper discharge port 506, so that the processor 10 determines to end the continuous duplex printing at the fourth print medium when the seventh page is printed to the fourth print medium and the fourth print medium is transported to the paper discharge port 506 (a7). Therefore, at the stage a7, a printing order in which the eighth page (fourth print medium) is printed last is decided (see FIG. 6).

Print data of the first print medium (the first and second pages) is discarded when the second page has been printed on the first print medium and the first print medium is discharged to the paper discharge tray 505 (a8). Print data of the second print medium (the third and fourth pages) is discarded when the fourth page has been printed on the second print medium and the second print medium is discharged to the paper discharge tray 505 (a9). Print data of the third print medium (the fifth and sixth pages) is discarded when the sixth page has been printed on the third print medium and the third print medium is discharged to the paper discharge tray 505 (a10). Print data of the fourth print medium (the seventh and eighth pages) is discarded when the eighth page has been printed on the fourth print medium and the fourth print medium is discharged to the paper discharge tray 505 (a11).

Figure 7:
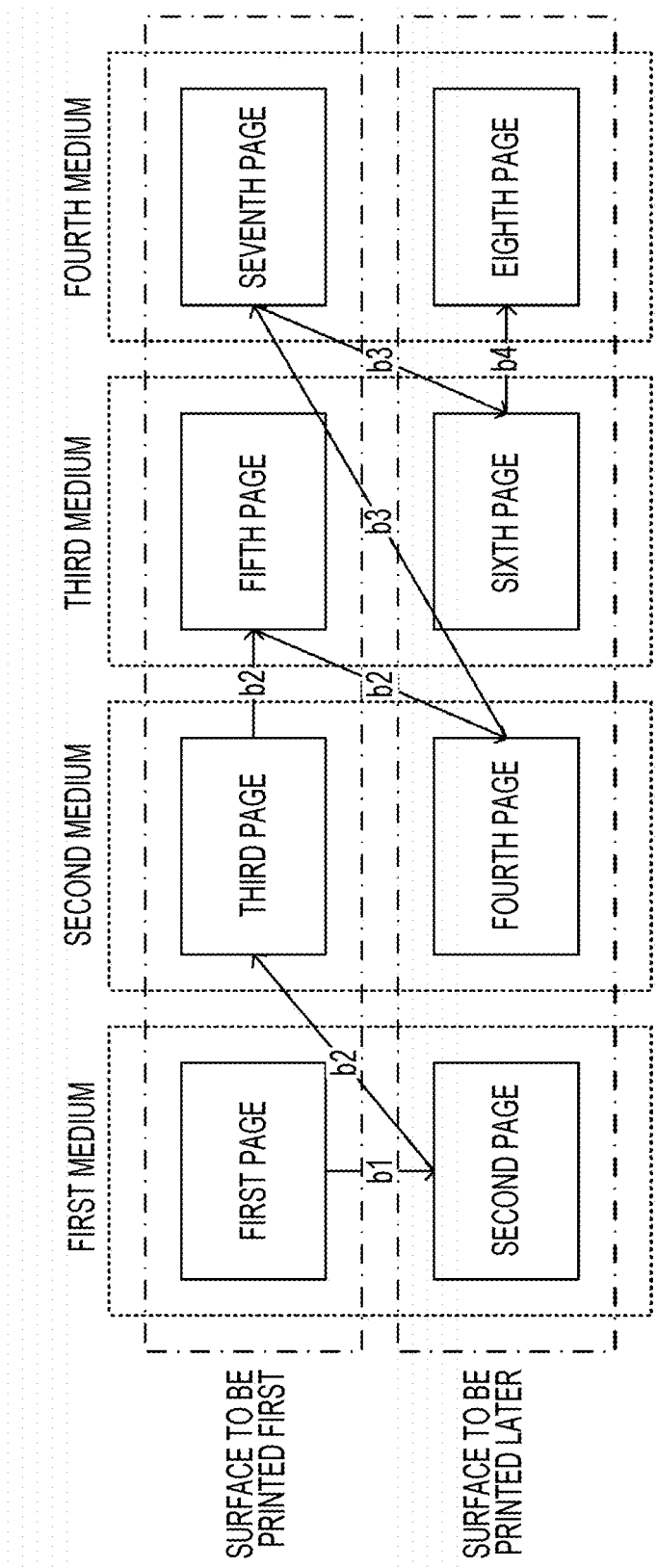
FIG. 7 is a schematic diagram showing a printing order of pages of a comparative example 1.

If the judgement timing of the method of duplex printing is only once, there are demerits as described below. An operation example of, for example, a configuration (comparative example 1) where judgement of duplex printing is performed only when the print preparation processing of a surface to be printed first of each print medium is started will be described with reference to the lower timing chart in FIG. 4. In the case of the comparative example 1, the normal duplex printing is determined for the first print medium, and the continuous duplex printing is executed on the second and following print media. Specifically, at the stage b1 (=a1) where the print preparation processing of the first page is started, reception of print data of the third page is not completed, so that the normal duplex printing of the first print medium is determined. Therefore, as shown in FIG. 7, at the stage b1, a printing order of the first page (first print medium) and the second page (first print medium) is determined.

The normal duplex printing is executed on the first print medium, so that a transport time (a part of T2 and a part of T3 and T4) occurs during a period of time from when the first page is printed to when the second page is printed. At the stage b2 where the print preparation processing of the third page is started, reception of print data of the fifth page is completed, so that execution of continuous duplex printing of the second and third print media is determined. Therefore, as shown in FIG. 7, at the stage b2, a printing order of the third page (second print medium), the fifth page (third print medium), and the fourth page (second print medium) is decided. Similarly, at the stage b3, execution of continuous duplex printing of the third and fourth print media is determined. Specifically, as indicated by b3 in FIG. 7, a printing order of the seventh page (fourth print medium) and the sixth page (third print medium) is decided. At the stage b4 where the print preparation processing of the seventh page is started, reception of print data of the ninth page is not completed, so that it is determined to end the continuous duplex printing at the fourth print medium. In other words, as indicated by b4 in FIG. 7, a printing order in which the eighth page (fourth print medium) is printed last is determined.

In this way, in the comparative example 1, as shown in the lower part of FIG. 4, the normal duplex printing is executed on the first print medium, so that a time required to print the total of eight pages increases as compared with the operation example of the present embodiment shown in the upper part of FIG. 4. In the present embodiment, even when the execution of the continuous duplex printing cannot be determined when the print preparation processing of the first page is started, the normal duplex printing is not necessarily immediately determined. The timing of the determination can be delayed at most to timing when the printing of the first page is completed and the first page is transported to the paper discharge port. Therefore, if a condition where the continuous duplex printing can be executed is established (if reception of print data of the third page is completed) until the most delayed timing described above, the continuous duplex printing can be executed from the first print medium. Therefore, as compared with the comparative example 1 shown in the lower part of FIG. 4, the execution of the continuous duplex printing can be more easily determined and the entire throughput can be more easily improved.

Figure 8:
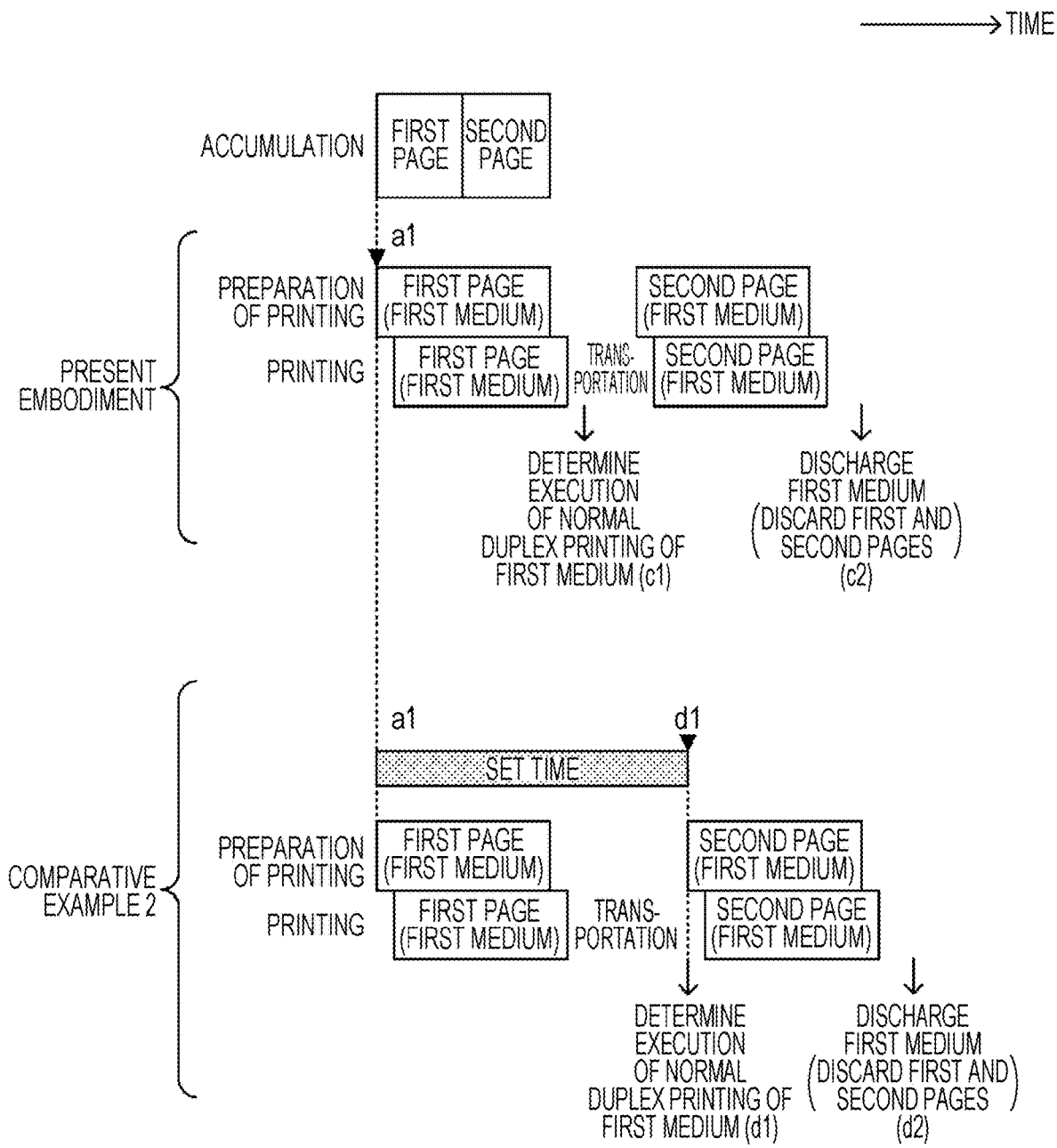
FIG. 8 is a timing chart showing an example of timing of accumulation of print data and printing.

Next, as another comparative example (comparative example 2), an operation of a configuration where the judgement timing of method determination of duplex printing is only once, and execution of the continuous duplex printing or the normal duplex printing is determined based on whether or not reception of print data of a surface to be printed first of the (N+1)th print medium is completed until a predetermined setting time elapses from when the print preparation processing of the surface to be printed first of the (N+1)th print medium is started will be described with reference to FIG. 8. In the comparative example 2, when the reception of print data of the surface to be printed first of the (N+1)th print medium is completed until the setting time elapses, the execution of the continuous duplex printing is determined, and when the reception of print data of the surface to be printed first of the (N+1)th print medium is not completed until the setting time elapses, the execution of the normal duplex printing is determined. The lower part of FIG. 8 is a timing chart of the comparative example 2, and the upper part of FIG. 8 is a timing chart of the present embodiment. A precondition of the present example for explaining difference between the comparative example 2 and the present embodiment is that the print job data includes print data of two pages and each page is printed on both surface of one print medium.

In the present embodiment, as shown in the upper part of FIG. 8, the duplex printing determination processing is started at the timing a1 at which the print preparation processing of the first page is started. At the stage c1 where the printing of the first page is completed and the first print medium is transported to the paper discharge port 506, print data of the third page is not received (because the print job has a total of two pages), so that at the timing c1, execution of normal duplex printing of the first print medium is determined. Therefore, after the timing c1, transport shown by T3 in FIG. 2 is performed, the first print medium is turned upside down, the printing of the second page is performed, and then the first print medium is discharged to the paper discharge tray 505 (c2).

In the case of the comparative example 2, as shown in the lower part of FIG. 8, print data of the third page is not received during a period of time from a1 where the print preparation processing of the first page is started to d1 where a predetermined length of setting time has elapsed from a1 (because the print job has a total of two pages), so that at the timing d1, execution of normal duplex printing of the first print medium is determined. Therefore, after the timing d1, as shown by T4 in FIG. 2, the first print medium is turned upside down, the printing of the second page is performed, and then the first print medium is discharged to the paper discharge tray 505 (d2). In a serial ink jet printer, a time required to print one surface of a print medium may vary according to content printed to the surface even when the size of the print medium is the same (for example, in a case where a printed surface is substantially occupied by blank space, print time is shorter than that in a case where a photographic image is arranged on the entire surface of the printed surface). Therefore, if the setting time is a fixed value, as shown in the comparative example 2 of FIG. 8, the start of printing of the second page may be uselessly waited even though the printing of the first page is completed. As a result, the discharge (d2) of the first print medium is delayed from the discharge (c2) of the present embodiment.

4. Other Embodiments

The embodiment described above is an example for carrying out the present disclosure, and other various embodiments can be employed as long as the normal duplex printing is executed when print data of a surface to be printed first of both surfaces of the (N+1)th print medium is not received before starting printing of a surface to be printed later of both surfaces of the Nth print medium, and the continuous duplex printing is executed when a part of print data of a surface to be printed first of the (N+1)th print medium has been received before starting printing of a surface to be printed later of the Nth print medium. For example, the present disclosure may be applied to a complex machine having a print function.

The receiving unit only has to be able to receive print data. In other words, received print data only has to be able to be accumulated in the storage unit. The configuration of the print job data is not limited to the example of the embodiment described above. The print data has not necessarily to be stored in order from the first page in the print job data. For example, when face-down discharge is performed by a printing apparatus to which the print job data is transmitted, the print data may be stored in order of a second page (a page to be printed first of the first print medium), a first page (a page to be printed later of the first print medium), a fourth page (a page to be printed first of the second print medium), and a third page (a page to be printed later of the second print medium) in the print job data.

The print control unit only has to be able to execute the normal duplex printing when print data of a surface to be printed first of both surfaces of the (N+1)th print medium (N is an integer of one or more) is not received before starting printing of a surface to be printed later of both surfaces of the Nth print medium, and execute the continuous duplex printing when a part of print data of a surface to be printed first of the (N+1)th print medium has been received before starting printing of a surface to be printed later of the Nth print medium.

In the embodiment described above, as indicated by the condition 2 of the duplex printing determination processing in FIG. 5, the continuous duplex printing of the Nth and (N+1)th print media is determined when all print data of a surface to be printed first of the (N+1)th print medium is completely received. However, the condition 2 (step S130) may be omitted. In other words, when a part of the print data of the surface to be printed first of the (N+1)th print medium has been received (S115: Yes) and the condition 1 is satisfied (S120: Y), the continuous duplex printing of the Nth and (N+1)th print media may be determined. For example, the condition 2 may be omitted as described above when a storage area with a size where print data of A4 three pages can be accumulated in an uncompressed state is secured in the storage unit (the continuous duplex printing is possible in a state where recovery can be performed by the printing apparatus 1 itself).

The condition 2 may also be omitted when a storage area with a size where print data of A4 three pages can be accumulated in an uncompressed state is not secured in the storage unit. However, in this case, there is a possibility that the recovery cannot be performed by the printing apparatus 1 itself. For example, print data is accumulated in the storage unit in order from the first page, and when a part of print data of the third page is received, a free space disappears from the storage unit and print data cannot be accumulated any more. When print data of a portion that has already been printed is sequentially discarded from the storage unit as soon as the portion has been printed, print data of the third page that has not been completely printed can be stored in the storage unit, so that the third page can be printed. However, when a paper jam occurs in the first print medium while the third page is being printed, the first print medium cannot be printed again unless print data of the first page is retransmitted because the print data of the first page has been discarded. When a specification that does not guarantee the recovery by the printing apparatus itself is employed, the condition 2 may also be omitted when a storage area with a size where print data of three pages can be accumulated in an uncompressed state is not secured in the storage unit. Therefore, even a printing apparatus that does not have a large capacity storage unit can execute the continuous duplex printing if the specification that does not guarantee the recovery by the printing apparatus itself is employed.

Further, the print control unit may have a configuration to perform judgement of execution determination of normal duplex printing or execution determination of continuous duplex printing at a plurality of timings during a period of time from when a part of print data of a surface to be printed first of the Nth print medium is received to when printing of a surface to be printed later of the Nth print medium is started. In the embodiment described above, the first timing of the plurality of judgement timings is timing when executing the print preparation processing of a page to be printed to a surface to be printed first of each print medium. However, the first timing may be other timing. For example, the first timing may be timing of transporting each print medium from a paper cassette or may be timing of discharging first ink to a surface to be printed first of each print medium.

In the embodiment described above, the last timing of the plurality of judgement timings is timing when the Nth print medium is transported to the paper discharge port in a state where printing of a surface to be printed first of the Nth print medium is completed and printing of a surface to be printed later of the Nth print medium is not completed. However, the last timing may be other timing. For example, the last timing may be timing when the Nth print medium is transported to a prescribed position in the transport path below the support table 503 shown by T3 in FIG. 2 (a position for waiting printing of a surface to be printed later).

In the embodiment described above, the continuous duplex printing is inapplicable in at least one of the following cases: paper feed methods of print media are different from each other (for example, cassette feed and back side feed), sizes of print media are different from each other, and paper types (paper qualities) of print media are different from each other. However, the continuous duplex printing may be performed even when the methods, the sizes, and/or the types are different.

In the embodiment described above, a maximum of two print media can be transported independently from each other at the same time in the transport paths T1 to T4 in FIG. 2 in the continuous duplex printing. However, three or mora print media may be able to be transported independently from each other at the same time in the transport paths T1 to T4.

Further, a method in which the normal duplex printing is executed when print data of a surface to be printed first of both surfaces of the (N+1)th print medium is not received before starting printing of a surface to be printed later of both surfaces of the Nth print medium and the continuous duplex printing is executed when a part of print data of a surface to be printed first of the (N+1)th print medium has been received before starting printing of a surface to be printed later of the Nth print medium as in the present disclosure can be applied as a print control program and a printing method. The system, the program, and the method as described above may be realized as a single apparatus, or may be realized by using components included in a plurality of apparatuses, and include various aspects. The system, the program, and the method as described above can be appropriately modified such as, for example, a part of them is software and a part of them is hardware. Further, the disclosure can be established as a recording medium of a program that controls a system. Of course, the recording medium of the program may be a magnetic recording medium, a semiconductor memory, or any recording medium to be developed in the future.

What is claimed is:

1. A printing apparatus comprising:
   a receiving unit that is configured to receive print data; and
   a print control unit that is configured to switch between normal duplex printing and continuous duplex printing within the same print job, wherein the print control unit is configured to execute normal duplex printing of an Nth print medium of a print job when print data of a first surface to be printed of an (N+1)th print medium is not received before starting printing of a second surface to be printed of an Nth print medium, and is configured to execute continuous duplex printing of an Nth print medium of the print job when a part or all of the print data of the first surface to be printed of the (N+1)th print medium is completely received a predetermined time before printing of the second surface to be printed of the Nth print medium is started, N being an integer of one or more, wherein in a case of the normal duplex printing, duplex printing is sequentially executed one print media at a time along a set of transport paths, such that the prior print media completes all of the set of transport paths prior to the next print media beginning the set of transport paths, and in a case of the continuous duplex printing, during a process where a print medium whose one surface was printed is transported to be turned upside down, one surface of another print medium is printed, such that the prior print media does not complete all of the set of transport paths prior to the next print media beginning the set of transport paths.

2. The printing apparatus according to claim 1, wherein the print control unit is configured to perform judgement of execution determination of the normal duplex printing or execution determination of the continuous duplex printing at a plurality of timings during a period of time from when a part of print data of a first surface to be printed of the Nth print medium is received to when printing of the second surface to be printed of the Nth print medium is started.

3. The printing apparatus according to claim 1, wherein the print control unit is configured to perform judgement of execution determination of the normal duplex printing or execution determination of the continuous duplex printing when the Nth print medium is transported to a paper discharge port in a state where printing of a first surface to be printed of the Nth print medium is completed and printing of the second surface to be printed of the Nth print medium is not completed.

4. The printing apparatus according to claim 1 is a serial ink jet printer.

5. A printing method comprising:
receiving print data; and
switching between normal duplex printing and continuous duplex printing within the same print job, wherein the print control unit executes normal duplex printing of an Nth print medium of a print job when print data of a first surface to be printed of an (N+1)th print medium is not received before starting printing of a second surface to be printed of an Nth print medium and executing continuous duplex printing of an Nth print medium of the print job when a part of the print data of the first surface to be printed of the (N+1)th print medium is completely received a predetermined time before printing of the second surface to be printed of the Nth print medium is started, N being an integer of one or more, wherein in a case of the normal duplex printing, duplex printing is sequentially executed one print media at a time along a set of transport paths, such that the prior print media completes all of the set of transport paths prior to the next print media beginning the set of transport paths, and in a case of the continuous duplex printing, during a process where a print medium whose one surface was printed is transported to be turned upside down, one surface of another print medium is printed, such that the prior print media does not complete all of the set of transport paths prior to the next print media beginning the set of transport paths.

6. The printing method according to claim 5, wherein in the case of normal duplex printing, a pre-feed mode is performed, wherein the (N+1)th print medium is fed when the Nth print medium is being printed, and the (N+1)th print medium is printed as soon as both surfaces of the Nth print medium finish are printed.

7. The printing apparatus according to claim 1, wherein in the case of normal duplex printing, a pre-feed mode is performed, wherein the (N+1)th print medium is fed when the Nth print medium is being printed, and the (N+1)th print medium is printed as soon as both surfaces of the Nth print medium finish are printed.

* * * * *